(12) United States Patent
Ivarson et al.

(10) Patent No.: US 10,826,780 B1
(45) Date of Patent: Nov. 3, 2020

(54) MANAGING NETWORK CONNECTIONS

(71) Applicant: Amazon Technologies, Inc., Seattle, WA (US)

(72) Inventors: Kristofer Thomas Ivarson, Woodinville, WA (US); Alaa Adel Mahdi Hayder, Seattle, WA (US); Emily Abbess, Seattle, WA (US); Seth Dwyer, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 332 days.

(21) Appl. No.: 15/629,520

(22) Filed: Jun. 21, 2017

(51) Int. Cl.
*H04L 12/24* (2006.01)

(52) U.S. Cl.
CPC ................... *H04L 41/12* (2013.01)

(58) Field of Classification Search
CPC combination set(s) only.
See application file for complete search history.

(56) References Cited

U.S. PATENT DOCUMENTS

2008/0138071 A1* 6/2008 Lee .............. H04H 20/69
398/67
2015/0052272 A1* 2/2015 Malone ............. H04L 41/24
710/113

* cited by examiner

*Primary Examiner* — El Hadji M Sall
(74) *Attorney, Agent, or Firm* — Davis Wright Tremaine LLP

(57) ABSTRACT

An active patch panel assembly splits an optical signal of a fiber optic cable into two signals: a first signal directed to a patch panel port and a second signal measured by an optical sensor unit. A network management service of a computing services resource provider receives signal information from the optical sensor unit regarding the optical signal. The network management server may compare the signal information with signal information received from another patch panel assembly. Based on a correspondence between the signal information of the different patch panels, the network management service may determine a data path association between the optical signals. The data path association may be recorded in a database that stores data path associations of a service provider.

20 Claims, 9 Drawing Sheets

| Panel Port ID | Signal Information | Data Path Ports | Location | Terminal Devices |
|---|---|---|---|---|
| A-1 | -20.7 dBm; 2017/03/25 8:45AM | B-2, C-5, E-8, N-2 | DC 8, R200 | A-1: SEA-W7<br>N-2: SEA-S3 |
| A-2 | DBA *Ref1 | B-7, D-1, E-4 | DC 1, R115 | A-2: ATL-95<br>E-4: RIC-18 |
| A-3 | DBA *Ref2 | B-7, D-1, E-3 | DC 1, R115 | A-3: WDC-15<br>E-3: PDX-09 |
| ... | ... | ... | ... | ... |
| N-1 | -23.4 dBm; 2017/03/25 8:45AM | A-1, B-2, C-5, E-8 | DC 3, R40 | N-1: HAL-9K<br>E-8: SFO-N1 |
| N | - | - | DC 16, R301 | - |

FIG. 7

MANAGING NETWORK CONNECTIONS

BACKGROUND

Networking devices may be interconnected using physical media to form computer networks. For instance, fiber optic cables may connect the port of a network device at one location with the port of a network device at another location. As the size and complexity of computer networks increases, so have the number of network devices and cables necessary to implement these networks. For data centers comprising a high volume of network connections, it is difficult to determine which cable connection corresponds to which network device.

The large number of networking devices and the corresponding complex interconnections between networking devices has made the task of managing networks more difficult. Even the task of maintaining records of the networking equipment and the interconnections between networking devices becomes burdensome in settings where there are a large number of networking devices that are connected to each other using physical media such as cables. This is especially true in networking environments where the network employs optical networking gear. For connections between network connection points and computing devices, determining a correspondence between network connection points or ports and computing devices may be a difficult and complex problem. Switching network traffic of a port off to determine which computing devices are affected is generally not a viable solution as networks require a high level of system availability and discontinuing network service to a network device is usually unacceptable. Manually maintaining a record of interconnections between networking equipment is inefficient and subject to human error.

BRIEF DESCRIPTION OF THE DRAWINGS

Various techniques will be described with reference to the drawings, in which:

FIG. 7 illustrates a network entry table stored on a database for cataloging network connections;

DETAILED DESCRIPTION

Figure 1:
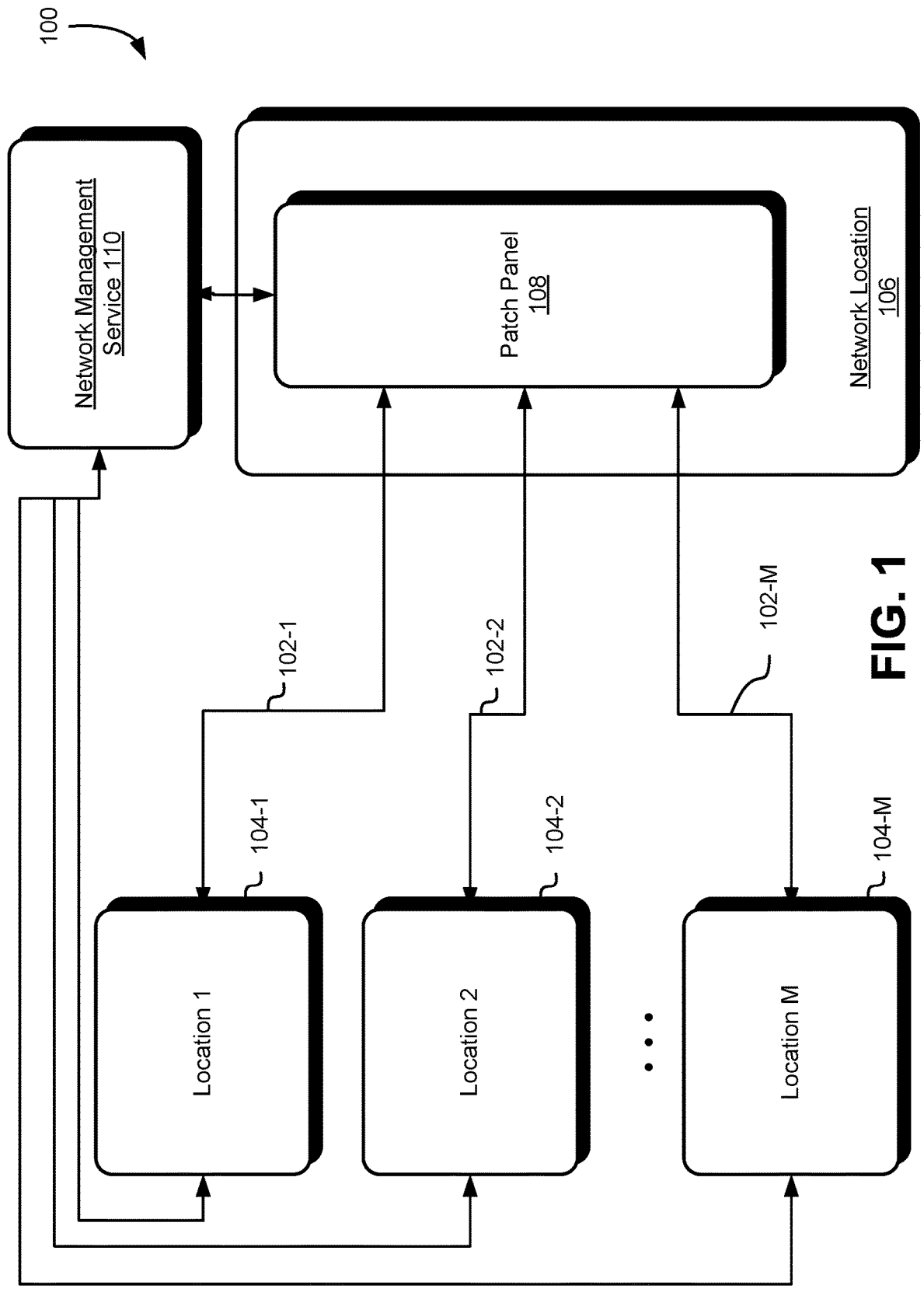
FIG. 1 shows an illustrative environment in which various embodiments may be practiced.

Techniques described and suggested herein include remotely monitoring, managing, and mapping network connection nodes to a network interface. Techniques described and suggested further include managing network traffic by identifying a network connection node connecting two network points and routing the network traffic through a different network connection node. Such methods and systems enable the ability to accurately identify one or more network connection nodes along a network data path between two network nodes, such as physical fiber optic connections between two devices in a network. The one or more network connection nodes may include a hardware assembly having a plurality of network connection ports, corresponding to a plurality of network connection nodes, each for receiving and communicatively connecting a network cable. According to the methods and techniques herein, an entity may determine a data path from a customer to a service provider by specifically identifying where each section of network cable connects to a hardware assembly through which data signals are passed from one section of network cable to another.

In examples discussed more completely below, network cables provided for conveying data signals may be connected to a plurality of ports of a patch panel assembly for routing data between network nodes. Typically, the ports are densely arranged on one or more exterior surfaces of the patch panel assembly such that it is difficult to connect or disconnect a cable at a given port without interference from one or more adjacent ports. Moreover, it is difficult to match actively networking connected ports at the patch panel assembly with corresponding network devices or nodes without removing the cable and interrupting network traffic. It is inefficient to manually trace a path of a cable from its connection to the patch panel assembly to the cable's terminus at the opposite end.

The techniques described in this document provide numerous other advantages not currently available in the industry. By way of non-limiting example, the techniques enable the ability to shift traffic from one port to another to allow removal of a connected cable without disrupting network traffic. Analyses may be performed based on a network signal to identify contaminated cables and/or cable connections that may be adversely affecting data transmission. Network traffic may be mapped through one or more datacenters to provide a routing table that may be dynamically updated to identify modifications to the network map (e.g., the network topology) that may improve network efficiency. Network maps and models may be used to scale the network by determining network growth and availability, and to anticipate future supply for network bandwidth.

In an example implantation, a network patch panel assembly is configured to receive, in a first patch panel port, a fiber optic cable coming from a first network node, such as a computing resource (e.g., personal computer) or a networking device (e.g., router, switch). The optical signal received from the first network node travels on a fiber optic cable in the patch panel and may be split or divided into a first signal and a second signal. The first signal may be conveyed over a length of fiber optic cable to a second patch panel port of a second patch panel, the second patch panel port being configured to receive and communicatively connect to a second fiber optic cable. The second signal is conveyed to a sensor configured to measure a characteristic of the second signal. The second signal may have a lower optical power than the first signal but may be similar or identical to the first signal in other respects. The patch panel is configured to provide information regarding the measured characteristic to a network management service. The patch panel may also receive control signals from the network management service and operate in accordance therewith.

The network management service may communicate with a plurality of patch panels to analyze network traffic between patch panels. For example, the network management service may receive signal measurements from each of the plurality of patch panels. Based at least in part on the signal measurements, the network management service may determine a corresponding signal source for each patch panel port. For example, the network management service may determine that a signal transmitted at a first port corresponds to a signal received at a second port based at least in part on a comparison between signal measurements associated with the first and second ports. The comparison may be based on characteristics of the optical signals transmitted, including instantaneous power, evolution of optical power over time, a change in optical power, signal shape, or the like. The comparison may be a part of a more complex analysis that includes other factors, such as the length of optical fiber cable, purity/type of cable used, optical loss at each cable connection, active gain/attenuation, maximum/minimum optical power values over a period of time, etc. Using these comparisons, the network management service may trace a data path from each signal's source to its destination. A network map may be generated based on the data paths to determine a precise and accurate path between interconnected network devices. The network management service may control a network traffic shifting device to reroute or shift network paths. For instance, the network traffic shifting device may be controlled to shift a signal's data path such that it travels along a different path from its source to its original destination. As another example, the network traffic shifting device may be controlled such that the signal is conveyed to a different destination.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

FIG. 1 is an illustrative example of an environment 100 in which various embodiments of the present disclosure may be practiced. In an embodiment, data is transmitted over fiber optic cables 102 between source locations 104 and a network location 106. The locations 104 may include a set of network connections to a set of corresponding computing devices. The data received at the network location 106 is conveyed through a network port of a patch panel 108 to a corresponding device, as described below in greater detail. The patch panel 108 is configured to measure a characteristic of the signal received at a corresponding port of the patch panel and transmit information regarding the measurement to the network management service 110. To measure the characteristic of the signal received, the signal may be divided or split into two separate signals; one of which is measured and the other of which is received at a network port of the patch panel, as discussed below in greater detail. One or more signals of the set of network connections at one or more of the locations 104 may be measured in a manner similar to the signals measured at patch panel 108. A signal at the location 104-1 transmitted over the cable 102-1 may also be split or divided into two separate signals, one of which measured and the other of which is transmitted to the network location 106. The signal measurement of the signal at the location 104-1 may be transmitted to the network management service 110, which may compare the measurements to determine which of the source locations 104 to which port of the patch panel 108 via a corresponding cable 102.

Figure 2:
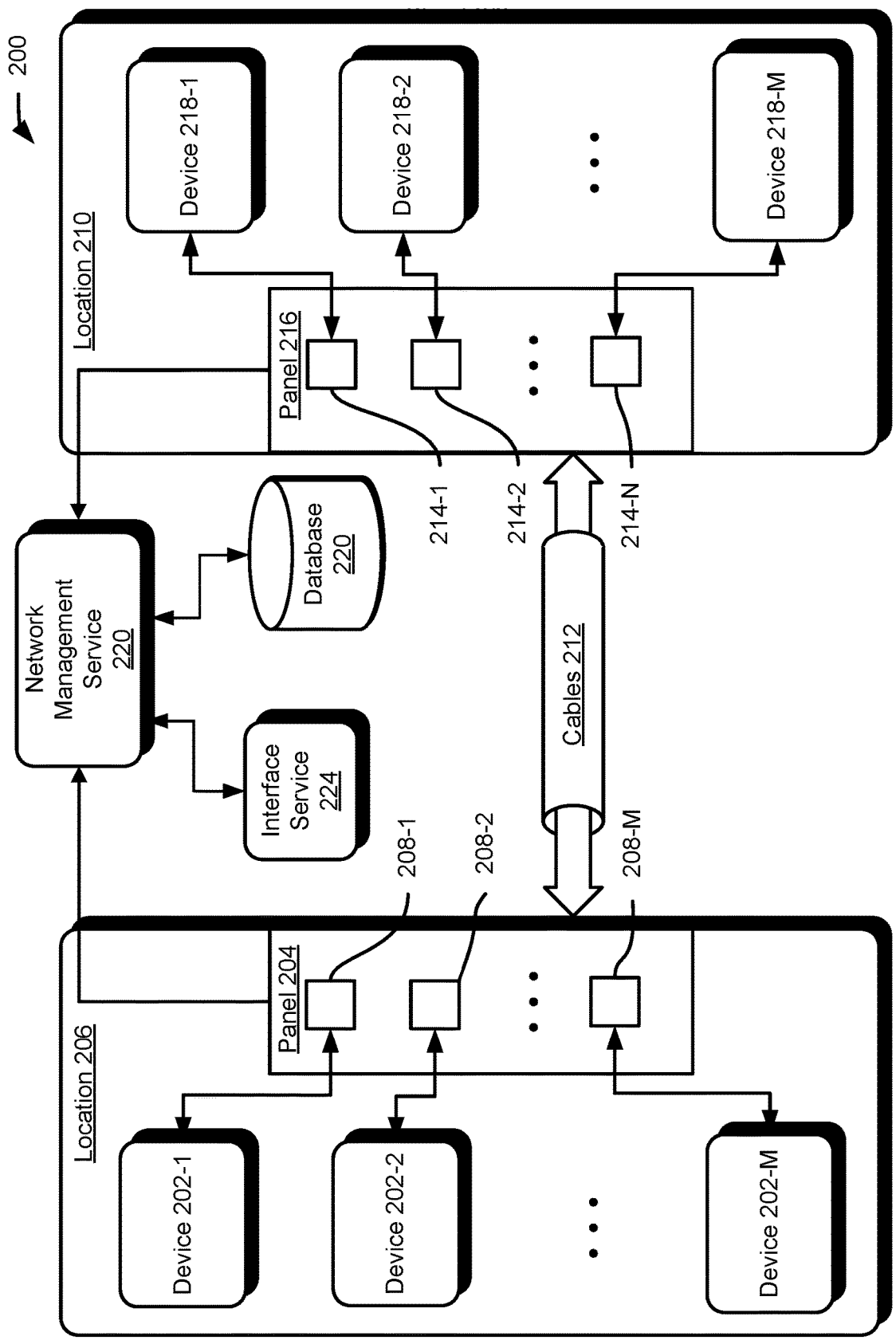
FIG. 2 shows an illustrative environment in which various embodiments may be practiced.

FIG. 2 is an illustrative example of an environment 200 in which various embodiments of the present disclosure may be practiced. The environment 200 may be, for instance, the environment 100 described above in connection with FIG. 1. A plurality of devices 202 may be communicatively attached to a patch panel assembly 204 located at a first location 206. Each of the devices 202 is connected to a corresponding port 208 via one or more fiber optic cables such that the devices 202 may transmit and/or receive data through the corresponding port 208. Data signals conveyed through the ports 208 are transmitted to and from a second location 210 via a bundle of fiber optic cables 212. One or more of the cables 212 are coupled to a corresponding port 214 of a patch panel assembly 216 at the second location 210. One or more devices 218 at the second location 210 may each be connected to a corresponding port 214 of the patch panel 216 via one or more fiber optic cables such that the devices 214 may transmit and/or receive optical signals through the corresponding port 214. The devices 202 and 218 may be computing devices (e.g., laptops, servers, personal computers) configured to transmit and receive optical signals. The computing devices may be communicatively coupled to computing resources associated with each of the first location 206 and the second location 210 such that the computing resources transmit and receive electronic network data through the computing devices.

The first location 206 may be a physically separate location than the second location 210. For instance, the first location 206 may be a premises (e.g., building, datacenter, campus) operated by a customer and the second location 210 may be a premises of a service provider providing one or more services to the customer. In one embodiment, the first location 206 and the second location 210 may be different locations for the same entity (e.g., service provider locations). For instance, the first location 206 and the second location 210 may be different locations within the same building or locations in different buildings. Those of ordinary skill in the art will appreciate that it is difficult to track which cable in the bundle of cables 212 is associated with which port at the patch panels 204 and 216. In particular, cables in the cable bundle 212 may be routed underground over long distances (e.g., 10 km or greater) between locations, or may be routed through building walls and ceilings. Moreover, some of the cables in the cable bundle 212 may be separated and joined with other bundles, and cables from other bundles may be connected to the patch panels 204 and 216. Accordingly, it may be difficult to determine which port 208 at the first location 206 is associated with which port 214 at the second location 210.

The patch panels 204 and 216 are configured to generate signal information regarding the optical signals transmitted or received through each of the ports 208 and 214. The optical signals for each of the ports 208 and 214 are split or divided so that the signal information can be generated without disrupting the optical signal. In particular, an optical splitter is used to split the signals over two branches. The optical signal on one of the branches is received at the intended patch panel port while the other optical signal is received at an optical sensor, which generates information contributing at least in part to the signal information. The patch panels 204 and 216 may transmit the signal information generated to a network management service 220. The network management service 220 may process the signal information to determine a data path for network traffic. In particular, the signal information may contain information regarding one or more characteristics of the signals, which the network management service 220 may extract or evaluate, as described below in greater detail. The network management service 220 may compare signal characteristics for signals of the ports 208 with signal characteristics for signals of the ports 214 to determine a connection correspondence between the ports 208 and the ports 214—namely, which of the ports 208 at the first location 206 is connected to which of the ports 214 at the second location 210.

The network management service 220 may interact with other services, devices, and systems. For example, the network management service 220 may record the connection correspondences determined between panels 204 and 216 as data path associations in a database 222. The data path associations stored in the database 222 may indicate a partial data path between separate locations, or may include a complete data path from a source device at which the signal originates (e.g., from a network router, computing resource) to a destination device at which the signal terminates. The data path associations may be aggregated to create a network map detailing connections between network nodes (e.g., network devices) and connections points therebetween. The network management service 220 may communicate with an interface service 224 that is configured to allow a user to ascertain information regarding network connections and to control network traffic. The interface service 224 may communicate with an application on a user device, such as a laptop, smartphone, or tablet, for example, to provide information regarding a status or data path association for devices and/or ports of the patch panels. In one embodiment, the network management service 220 may receive a request from the interface service to determine which port 214 of the patch panel 216 is connected to port 208-1, retrieve information specifying the requested connection correspondence from the database 222, and provide the information to the interface service 224. In one embodiment, the network management service 220 may communicate with a network device 208 to shift traffic to a different port 208. Accordingly, the cable at a corresponding port 214 may be disconnected for maintenance without disrupting service to the corresponding device 202.

Figure 3:
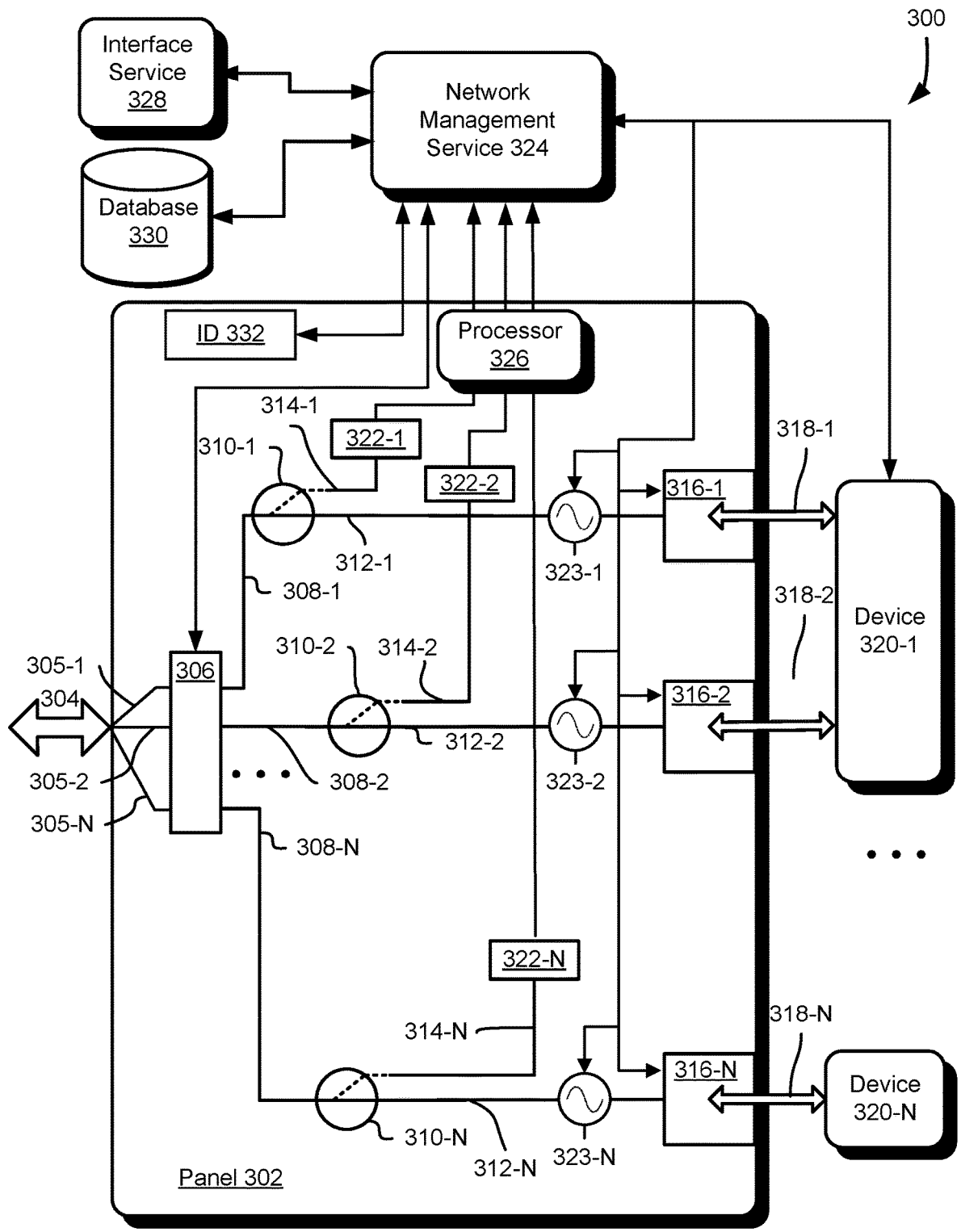
FIG. 3 shows an illustrative example of a patch assembly communicatively coupled to devices.

FIG. 3 illustrates a diagram of a patch panel 302 and an illustrative environment 300 in which the patch panel 302 may be utilized. A bundle of fiber optic cables 304 is received through an aperture or harness in the patch panel 302. The bundle 304 may comprise individual cables or groups of cables 308 (e.g., cable pairs) within the panel 302. Each of the cables may be dedicated for either transmitting or receiving an optical signal to or from a port 316 of the patch panel 302. In one embodiment, the patch panel 302 may include a shifting unit 306 to shift or reroute optical signals from one port to another port, as described below. In one embodiment, each of the cables 308 may be continuations of the cables 305 without the intervening shifting unit such that the cables 308 and 305 are continuous lengths of cable. Each of the cables 308 is connected to a fiber optic splitter 310 that splits or divides an optical signal between a first branch 312 and a second branch 314 at a given ratio. Specifically, the optical signal is split such that the first branch 312 receives a portion of the optical signal, and the second branch 314 receives the remaining portion of the optical signal. For example, if the ratio of the splitter 310 is 99-to-1, 99% of the optical power of the optical signal would be routed through the first branch 312 and the remaining 1% of the optical power would be routed through the second branch 314. The first branch 312 from the splitter 310 is connected to a terminal of the network port 316 of the patch panel 302. A receptacle of the network port 316 is configured to receive and communicatively connect a second fiber optic cable 318 for conveying the optical signal between the first branch 312 and a second network node, such as a device 320.

The second branch 314 is connected to an optical sensor unit 322 that is configured to measure one or more characteristics of the optical signal. The optical sensor unit 322 may include a photodetector that converts light into an electrical signal. In one embodiment, the optical sensor unit 322 may detect the optical power of the optical signal and provides an indication of optical power detected to a network management service 324. The optical sensor unit 322 may include one or more signal conditioning elements, such as an A-to-D converter that converts an analog signal from the photodetector into a digital signal, or an amplifier that amplifies the analog signal from the photodetector.

A signal injection device 323 may be connected to one or more of the fiber optic cables of the patch panel 302. The signal injection device 323 is configured to introduce or inject a specified optical signal onto the optical cable conveying the existing optical signal containing information. A user may interact with an application on a user device, as described below with respect to FIG. 8, to select or configure the specified signal to be introduced onto the fiber optic cable. The network management service 324 may control each injection device 323 to cause introduction of a specified optical signal. The injection device 323 may comprise a fiber optic transmitter, such as an LED or a laser diode, configured to produce optic signals of varying frequency, amplitude, and/or waveform. The specified optical signal produced may be introduced onto the fiber optic cable without significantly disrupting the optical signal conveying the information. For example, the introduced optical signal may be introduced using a fiber optic coupler or a fiber optic wavelength division multiplexer. The introduced optical signal may have a sinusoidal or trigonometric waveform having a low frequency and/or amplitude relative to the optical signal conveying information such that the information contained in the optical signal is not corrupted, destroyed, or otherwise disrupted. For example, the introduced optical signal may be a signal having a sine or cosine shape in the range of frequency (e.g., 1 Hz, 10 Hz) with an amplitude on the order of −20 to −30 dBm. As a further example, the introduced waveform may be a square wave or triangle wave introduced once per second (i.e., 1 Hz) having an amplitude of −30 dBm. Other waveform shapes, amplitudes, and/or frequencies that do not significantly corrupt or disrupt information contained in the optical signal are contemplated to be within the scope of the current disclosure.

The introduced optical signal may be introduced on a patch panel that is upstream of another patch panel to detect an optical signal path corresponding to a data path from one patch panel to another downstream patch panel. In an embodiment, with reference to FIG. 2, a user may wish to determine one or more ports 208-1 through 208-N of patch panel 204 that are providing data to one or more corresponding ports 214-1 through 214-N of patch panel 216. For instance, a user may wish to determine which port 214-1 through 214-N of patch panel 216 is on a same data path as port 208-1 of patch panel 204. Accordingly, a signal injection device 323 connected to a fiber optic cable connected to port 208-1 in patch panel 204 may be controlled to introduce a user specified or selected optical signal onto a transmitting side of one or more fiber optic cables in the patch panel 204 transmitting data therefrom. The optical sensor units 322 of the patch panel 216 may provide measurements of the optical signals on the fiber optic cables 308-1 through 308-N to the processor 326 (described below) and/or the network management service 324. The network management service 324 may identify which, if any, of the optical signals measured at the patch panel 216 correspond to the one or more optical signals introduced by the injection device 323 into the fiber optic cables at the patch panel 204. The network management service 324 may classify optical signals determined as being on a same optical signal path based on the signal introduced at panel 204 corresponding to an optical signal measured at panel 216 such that one or more data paths may be identified between ports of the patch panel 204 and patch panel 216. Therefore, the network management service 324 may be implemented to identify an optical signal path corresponding to a data path association between a port 208 of the patch panel 204 and a port 214 of the patch panel 216 without disconnecting a fiber optic cable or disrupting network traffic. The network management service 324 may record identified data path associations in a database 330 for future reference.

A processor 326 may be provided to perform various functions related to sampling the information from the optical sensor units 322. In one embodiment, the processor 326 may sample some or all of the optical sensor units 322 simultaneously at given time intervals, such as every microsecond. In one embodiment, the processor 326 may sequentially sample the optical sensor units 322 (e.g., by multiplexing). The network management service 324 may control how the processor 326 samples the optical sensor units 322, or the processor 326 may be preprogrammed (e.g., with executable code, field-programmable) to sample the optical sensor units 322 in a given manner. The processor 326 may be a part of the panel 302 or may be separate from the panel 302. The processor 326 may transmit additional information regarding the panel 302 to the network management service 324. The processor 326, for example, may timestamp each measurement taken from the optical sensor units 322 marking the time at which the measurement was made. As another example, the processor 326 may include identification information, such as identification information of the port corresponding to the cable from which the measurement was taken. Other identification information may include information identifying aspects of the panel, such as a location of the panel or an identification number corresponding to the patch panel.

The network management service 324 may receive and process signal information regarding the optical signals, such as information regarding the optical power of the signals. The network management service 324 may analyze the signal information received in conjunction with information regarding optical signals at one or more panels at other locations to determine a network connectivity relationship between ports of different panels and/or devices connected thereto. The network management service 324 may be configured to analyze the signal information to determine a complete network map of network ports, nodes, and/or devices, or the network management service 324 may be configured to analyze the signal information in response to receiving a request from an interface service 328. The network management service 324 may store the signal information and network connectivity information a database 330.

The shifting unit 306 is configured to shift or reroute optical signals travelling along one optic cable 308 to another optic cable 308 such that network traffic may be routed from one port 316 to another port 316 without disrupting service. In one embodiment, the shifting unit 306 may comprise an array of optical switches to redirect the optical signal received at one of cables 305 of the bundle 304 from one of the cables 308 to another of the cables 308. For instance, an optical signal on cable 305-1 may initially be routed to travel along cable 308-1. An optical switch in the shifting unit 306 may be controlled to shift or reroute the optical signal received from cable 305-1 to cable 308-2 thereby shifting the network traffic from port 316-1 to port 316-2. In one embodiment, optical redirecting devices employing lenses and/or mirrors may be implemented to shift or reroute the network traffic. The network management service 324 may be communicatively connected to the shifting unit 306 to control shifting or rerouting of the network traffic from port to port. A user, such as a technician, may wish to route the traffic on port 316-1 to an unused port 316-2 to replace or clean the cable 316-1 without disrupting service, for example. The user may send, through the interface service 328, a request to the network management service 324 to reroute the traffic on port 316-1 to port 316-2. The network management service 324 may control the shifting unit 306 to reroute traffic and then notify the user, through the interface service 328, that the cable 316-1 may be disconnected.

The panel 302 may include several other features. For instance, the ports 316 of the panel may include an LED or other indicator for notifying a user of a particular port such as a port that has no network traffic or a port that corresponds to a specific customer. The network management service 324 may send a control signal to specific ports causing the LEDs to illuminate. The panel 302 may also include an identification unit 332 that provides identification information for identifying the patch panel 302, such as a radio frequency identification tag (RFID) that emits a unique radio frequency signal for location and/or identification purposes. The network management service 324 may retrieve information from the identification unit 332 such as location information (e.g., datacenter, room number) and/or identification information, such as a unique identification number, associated with the panel 302.

Although panel 302 is depicted as having only a single port 316 for each device 320, the panel 302 may actually comprise a pair of ports for each device 320—one for transmitting and one for receiving. Accordingly, each of the fiber optic cables 308 may comprise one or more pairs of fiber optic cables, wherein one of each pair is for transmitting an optical signal from the panel 302 to a network node and the other of the pair is for receiving an optical signal from a network node. A splitter 310 may be provided for each cable of the cable pairs and an optical sensor unit 322 may be provided for each second branch 314 split from each cable 308.

Figure 4:
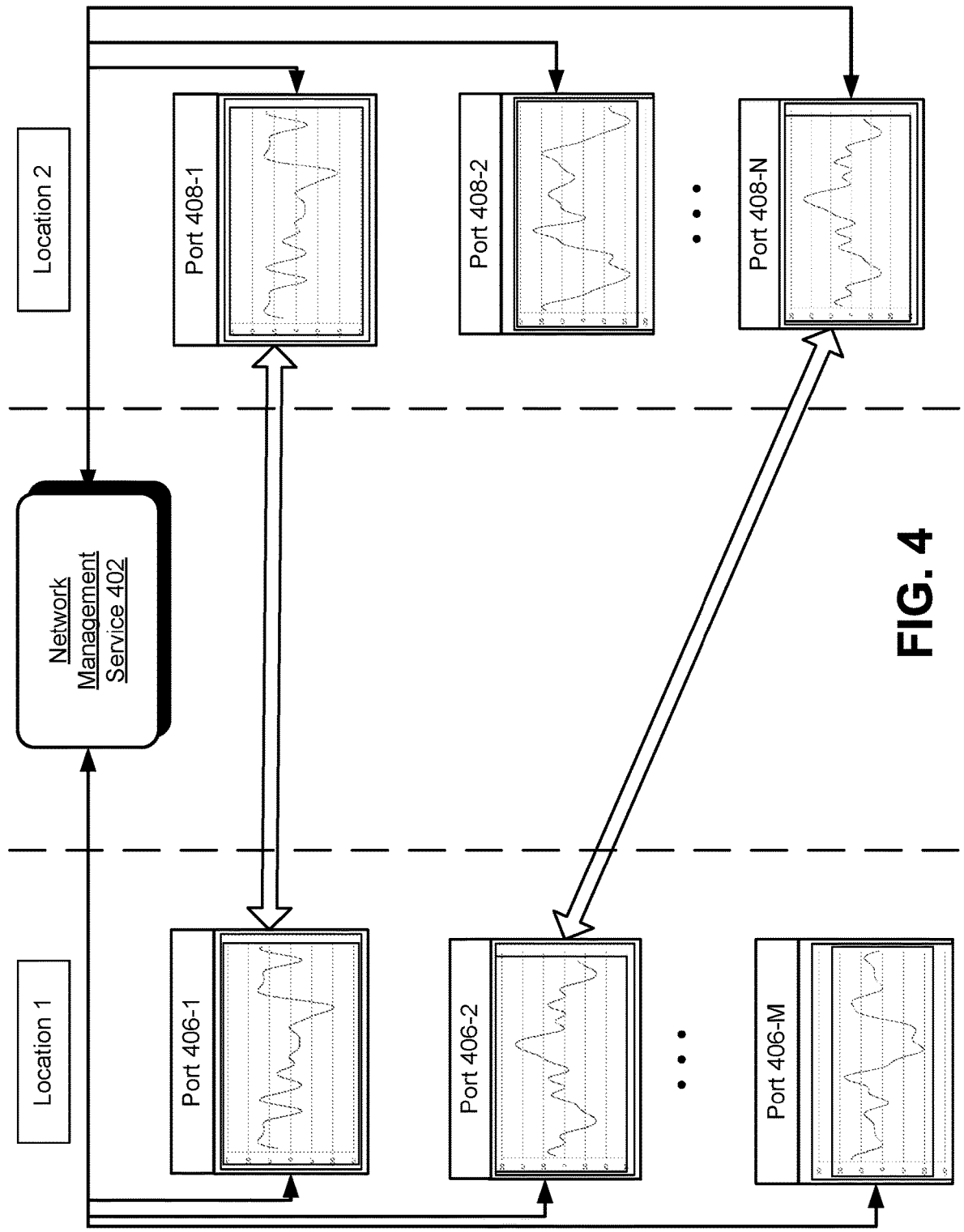
FIG. 4 shows an illustrative example of matching network signals using a network managing service.

FIG. 4 illustrates an illustrative example of an analysis 400 performed by the network management service 402. The management service 402 may gather information regarding optical signals gathered from ports 406 at a first location corresponding to a first datacenter or a panel, by way of example. The management service may gather information regarding optical signals gathered from ports 408 at a second location corresponding to a second datacenter or a second panel. The network management service 402 may store the information gathered in and retrieve the information from a database, as disclosed herein. The management service 402 may analyze the information to determine which ports 406 of the first location correspond to which network ports 408 of the second location based, for example, on analysis of a waveform, or one or more data points obtained. As illustrated, the management service 402 may determine that the information gathered from port 406-1 matches the information gathered from port 408-1. Accordingly, the management service 402 may then correlate the network relationship between port 406-1 and port 408-1—for example, by recording that there is a data path association between ports 406-1 and 408-1 in a database. Similarly, the management service 402 may determine that the information gathered from port 406-2 corresponds to the port 408-N, and correlate the network relationship therebetween. By contrast, the ports 406-M and 408-2 do not match, so a correlation therebetween is not determined. Although the matches illustrated in FIG. 4 appear identical, such a high level of similarity is not required. It may be sufficient that the information gathered from one port is approximately the same as another port—for example, within 1% of an expected value. The analysis 400 may also take other factors into account, such as attenuation over a length of fiber optic cable, as described below in greater detail.

Figure 5:
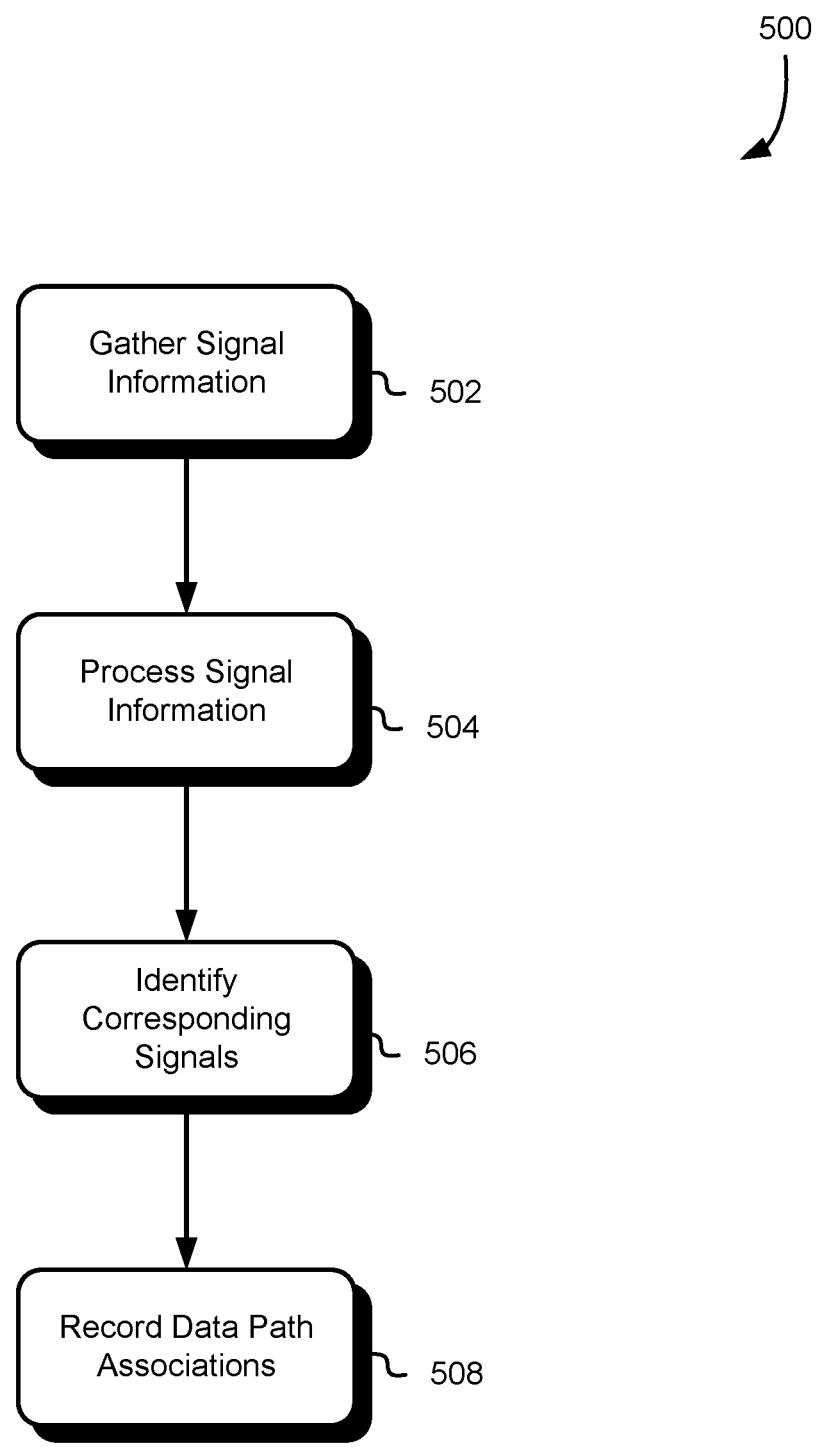
FIG. 5 shows an illustrative example of a process for determining data path associations for a network.

FIG. 5 depicts a block diagram illustrating an example of a process 500 for determining data path associations in accordance with various embodiments. The process 500 may be performed by any suitable system, such as by a computing resource service provider system operating the network management service described herein. The network management service may be operated, for example, on a server or other computing resource of the service provider. The network management service may interact with other services of the service provider, such as the interface service described herein, as well as various devices, such as computing resources, network devices, and patch panel assemblies.

As shown in FIG. 5, at block 502, the management service gathers or receives signal information 502 regarding one or more optical signals each transmitted or received through a network port of a patch panel. In particular, the signal information may correspond to one or more signal measurements made by the optical sensor units 322 described above. The signal information may include information sufficient to characterize one or more aspects of the signal, such as its amplitude and a time at which the signal measurement was made. The signal information may include other aspects, such as information sufficient to identify the port associated with the signal, identify the panel associated with the signal, and/or determine a location of the panel. Gathering 502 may include gathering or receiving a series of measurements for one or more of the optical signals over a time period. The management service may store the measurements in memory, such as volatile (e.g., RAM, cache) or non-volatile memory (e.g., ROM), or may store the measurements in the database as described below in greater detail.

The management service may process 504 the signal information to ascertain various characteristics of the optical signal measured. For instance, the management service may process the signal information to determine the optical power of the optical signal. The management service may determine or calculate the optical power of the signal over a time period. Other information regarding the signal may be determined or calculated, such as the frequency of the optical signal. Information generated from the processed signals may be stored in the database in association with the port associated with the optical signal. Those of ordinary skill in the art will understand that blocks 502 and 504 may be repeated to obtain information sufficient to perform subsequent processes.

At block 506, the network management service may use the information ascertained to identify corresponding optical signals. The management service may select a particular patch panel port for which to determine a corresponding network relationship to another patch panel port. The selection may be a result of a user request, submitted via the interface service, to determine a corresponding patch panel port for a selected patch panel port or a group of patch panel ports.

The management service may review or analyze the signal information for a time period T to determine a correspondence between patch panel ports. The correspondence determined between optical signals may be based on a closeness of a value obtained for one patch panel port to another patch panel port. In one embodiment, the management service may obtain a measurement or calculated value of the optical signal at the selected port for a specified time period T for which to find a corresponding measurement or calculated value. The management service may query the database to find a value in the specified time period T that corresponds to the value obtained. Other characteristics may be used to identify an optical signal correspondence, such as a frequency characteristic or spectral profile of the optical signals.

In one embodiment, correspondence between optical signals may be based on a similarity of the evolution in optical power of a signal measured at an optic cable connected to one patch panel port to the evolution in optical power of a signal measured at an optic cable connected to another patch panel port. For instance, the network management service 324 may collect data for optical signal measurements from a plurality of patch panel ports of one or more patch panels over a period of time. The network management service 324 may then compare the data collected to identify evolutions in optical power that are similar, based on one or more factors, including, but not limited to slope, inflection points, and energy content. As one example, the network management service 324 may determine that two signals correspond based on one or more inflection points that occur in a first signal simultaneously with one or more inflection points that occur in a second signal. Correspondence between two signals may be based on similar upward or downward trends, such as where two optical signals both have a similar upward, downward or constant slope, or where two optical signals have a slope that is more similar to each other than other signals within the same time period. In particular, a pair of signals may be determined as corresponding where the optical power remains within 5% of each other over a given time period whereas the other measured signals differ from the pair of signals over the same time period. As a further example, the measured optical power of a set of signals may be integrated over a period of time to identify a pair of signals whose energy content is the most similar, or within a predetermined threshold (e.g., within 1%, within 3%).

In one embodiment, the correspondence between optical signals may be based on a change in the optical power of a first signal that is similar to a change in the optical power of a second signal. The network management service 324 may record or detect a change in the optical power of one signal over a time period. The change may be detected in recorded data or observed in real time. The change in optical power may be identified as similar increase or decrease in optical power over a given period of time. In one embodiment, the network management service 324 may identify a particular change based on the change exceeding a predetermined threshold—for example, a change exceeding ±0.5 dBm within a given time period. The predetermined threshold may be a setting programmable by the user in a settings menu of the user interface 800 described below. The network management service may identify a change in the optical power of the first signal exceeding the predetermined threshold, and then look for a similar change in optical power of another signal. If such a change in another signal (or the second signal) is identified, the network management service 324 may determine that there is a correspondence between the signals such that the signals are along the same optical path or same data path.

The correspondence between optical signals of patch panel ports may be based upon an expected value of an optical signal at a patch panel port. That is, the network management service may account for different factors in identifying a corresponding optical signal, such as the attenuation of the optical signal over the length of the optic cable between two patch panels. The length of fiber optic cable extending between a patch panel at first location and a patch panel at a second location may be 10 km or greater. The management service may factor in the fact that the optical signal may be attenuated by a given amount over the length of the cable to determine an expected attenuation of a signal at port. The management service may calculate the expected attenuation of the signal transmitted from a given patch panel port based on the length of the cable to a second patch panel, and subtract the expected attenuation from the transmitted optical power to determine an expected value or waveform to search for at the second patch panel. The management service may then correlate which of the ports at the second patch panel corresponds to the port transmitting the optical signal by matching the expected value or waveform with the information obtained for each of the ports at the second patch panel.

In one embodiment, the management service may cause a specified signal to be transmitted in an optical signal for which a corresponding optical signal is to be determined. The specified signal may be introduced by the signal injection device 323 described above. The signal transmitted from the first patch panel, for example, may be introduced in addition to or combined with a low frequency signal. At the second patch panel, the management service may search for an optical signal having the same low frequency component to correlate the signals. The low frequency signal may have minimal impact on the data transmitted from the first patch panel, and therefore will not adversely affect or disrupt network traffic.

After identifying a correspondence between optical signals, the network management service may record a data path association 508 between the patch panel ports associated with the corresponding optical signals. The data path association is an indication that the data transmitted from a first patch panel port is received at a second patch panel port. The management service may record the data path association in the database in a manner that enables the entries to be sorted and quickly located. The records may be indexed by the entity associated with the data transmitted using the optical signal, by location, by patch panel, or by any other field. The records may be used to generate a network map detailing associations between network nodes (e.g., networking devices, computing resources) and patch panels.

Figure 6:
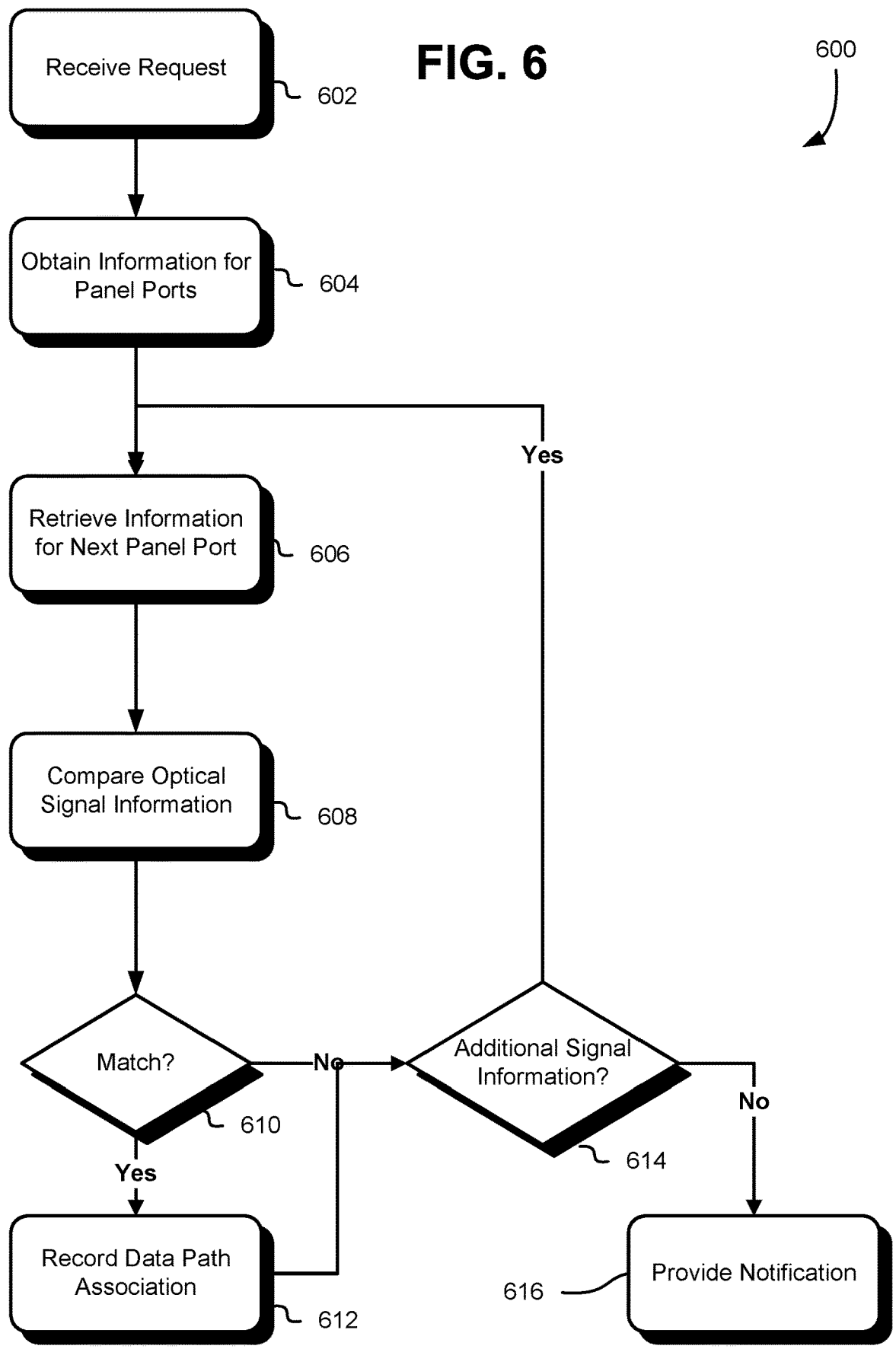
FIG. 6 shows an illustrative example of a process for determining a data path association for a patch panel port.

FIG. 6 depicts a block diagram illustrating an example of a process 600 for determining which patch panel port is providing the optical signal from a specified patch panel port. The process 600 may be performed by any suitable system, such as one or more computing resources operating to provide the network management service. The network management service may receive 602 a user request, over a network, to identify a specified patch panel port. For example, the request may be to determine which patch panel port of a particular patch panel corresponds to a patch panel port of another patch panel. The request may include identification information identifying the specific patch panel port at issue and the patch panel for which a corresponding patch panel port is to be identified. The network service may obtain 604 signal information for the patch panel ports in specified patch panel. Obtaining the signal information may also include obtaining signal information for the specific patch panel port identified. The signal information for the signal information obtained may be time correlated such that the signal information obtained is all obtained for a same time period. The signal information obtained may be stored in a database or other data storage system or device for retrieval.

At block 606, the network management system retrieves 606 signal information corresponding to one of the patch panel ports. The signal information retrieved is compared 608 with the signal information for the specified patch panel port. In step 610, the network management service determines whether the retrieved signal information matches the signal information for the specified patch panel port. The match may be determined based on a correspondence between the signal information, as described above. For example, the correspondence may be a correspondence in the evolution of optical power of the optical signals over a time period. The network management service 324 may identify a change in optical power occurring at one port over a time period and determine a correspondence to another port based on a similar change in optical power over the same time period. As another example, the correspondence may be determined based on the similarity of the instantaneous optical power for a given time period. Further, the correspondence of the optical power indicated by the signal information retrieved to an expected optical power based in part, for instance, on a length of fiber optic cable between the patch panels and the estimated signal attenuation over the length of fiber optic cable.

If the network management service determines that there is a correspondence between the signals, then a data path association between the patch panel port for the retrieved signal information and the specified patch panel port is recorded 612. As described above, the data path association indicates that the optical signals provided at one of the patch panel ports is a downstream signal to the other of the patch panel ports. Stated otherwise, the data path association indicates a continuous optical path from one patch panel port to the other. In block 614, the network management service may determine whether there is additional signal information for ports in the patch panel at issue that has not been compared to the signal information for the specified port. If so, the process returns to retrieve 606 the additional signal information for comparison. If not, the network management service may provide 616 a notification to the user indicating which, if any, patch panel ports correspond to the patch panel port specified in the request.

FIG. 7 is an illustrative example of a data entry table 700 stored in a database. The table 700 may correspond to information provided to the database by the network management service. The table 700 may be generated as part of the processes 500 and 600 described above. The table 700 may include a panel port identification number 702 for each port of the patch panel assemblies serviced by the network management service. The management service may store signal information 704 for each of the ports referenced. For example, the signal information may include optical signal measurements, such as optical power measurements, associated with a timestamp or time period. The signal information 704 may reference another location in the database (e.g., DBA References) at which a larger composite of measurements for the corresponding port are stored.

The table 700 may include data path ports 706 identifying other ports which the management service has determined correspond to a given port. For instance, ports B-2, C-5, E-8, and N-2 have been correlated as being on the same data path with the port having the port ID A-1 (i.e., port 1 of panel having an identifier A). That is, the ports listed (B-2, C-5, E-8, and N-2) may each constitute a data path association with a given port A-1. The order of the port listing may indicate a path that an optical signal takes from its source to its destination. The determination of the order may be based on the descending order of magnitude of the optical power of an optical signal along the data path. The table 700 may also include the location 708 at which the port having the specified port ID is located (i.e., datacenter 8 for port A-1). The table 700 may identify terminal devices 710 identifying one or more devices connected at each end of a data path association For the patch panel A, for instance, patch panel port 1 (i.e., A-1) is physically connected to a device having the device identifier "SEA-W7". A device having the device identifier "SEA-S3" is physically connected at the patch panel port N-2 at the other end of the data path. Therefore, the table 700 may identify each patch panel port comprising a data path along which an optical signal travels from one device to another device. The table 700 may enable the network management service to generate a network map designating connections between patch panels, networking devices, computing resources, and/or locations. The table 700 may include other information not shown, such as entity information identifying one or more customer entities associated with the optical signal transmitted through a given port.

The information in the database table 700 may be used to determine additional information. The signal information 704 may be used to identify ports or cables that are contaminated or otherwise faulty. For instance, the network management service may track signal information over time to determine fault or contamination conditions. A decline in the optical signal power at a given port, in the absence of other factors, may indicate that the cable connection is contaminated or dusty, and should be cleaned. Alternatively, such a decline may indicate that a fiber optic cable is faulty or has broken. The location information 708 may also be used to factor information regarding an expected attenuation between two network nodes or patch panel ports.

Figure 8:
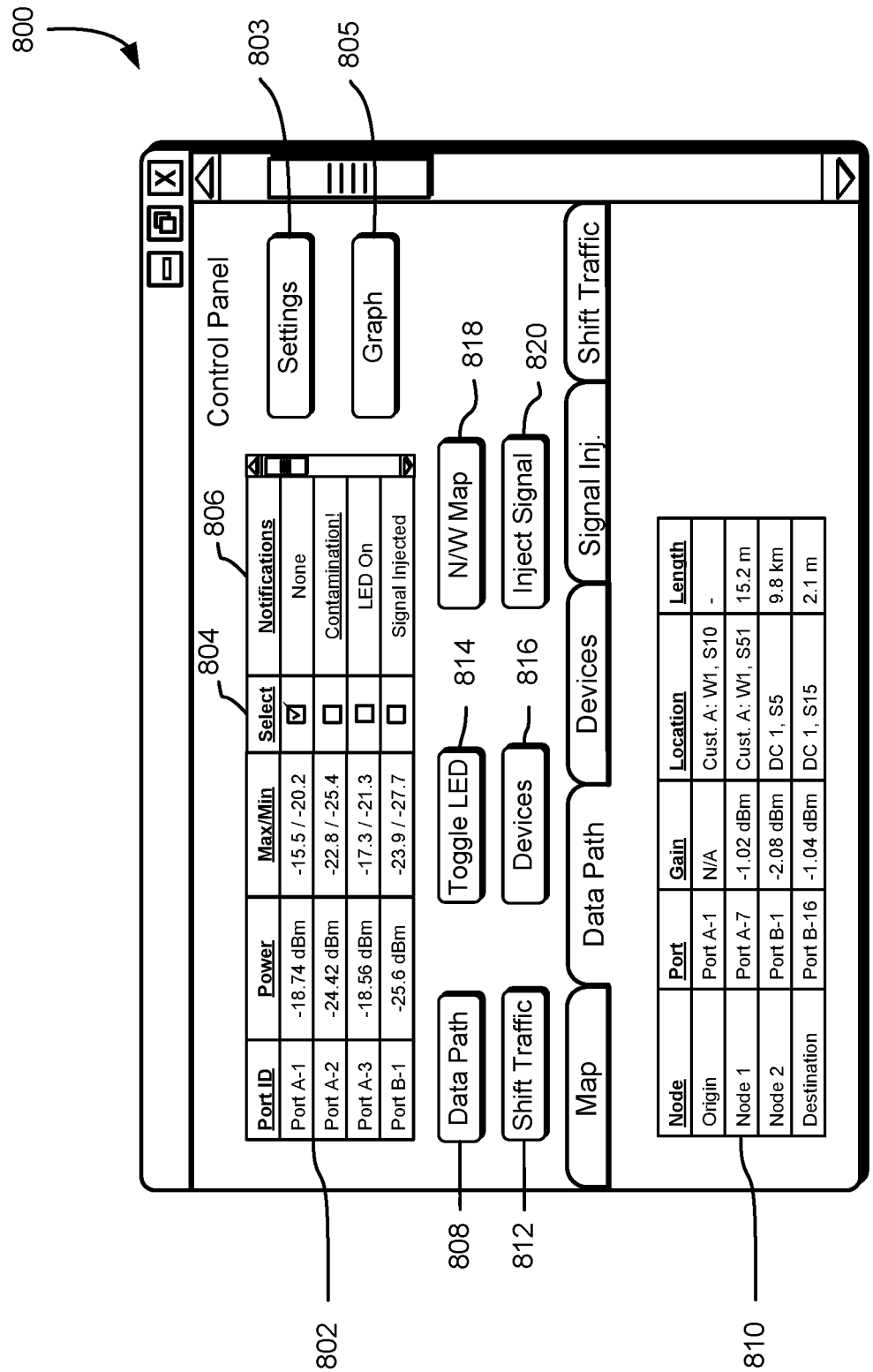
FIG. 8 illustrates a user interface for monitoring and managing network traffic of the patch panel assembly.

FIG. 8 illustrates an example user interface 800 as may be used with an embodiment of the present disclosure. As illustrated in FIG. 8, the user interface 800 may be used to view information regarding the patch panel ports and to perform several operations with respect thereto. A status window 802, for example, may display various information regarding the ports, such as the port ID and optical power information. The optical power information may include the instantaneous or current optical power, the optical power at a given time, or the maximum and/or minimum optical power over a given time period (e.g., last 24 hours). The given time or time period may be specified by a user in a settings 803 button. The window 802 may include a selection column 804 for selecting one or more of the ports and performing operations for the selected ports. A notification column 806 may indicate various notifications for the corresponding port, such as an indication that an LED light is currently on at the corresponding port, that the connection at the port may be contaminated, or that a signal is being injected onto the optic cable by a signal injection device 323. A user may view a graph illustrating the evolution of one or more of the optical signals over time by pressing a graph button 805 of the interface 800.

Using the selection column 804, a user may select one or more ports and perform various operations by tapping user interface buttons. The user may tap the data path button 808 to determine which other ports are connected to the selected port. The data path button 808 may cause the interface service to transmit a request to the network management service to identify the signals corresponding to the optical signal for the selected port, as described above with respect to FIG. 5. Once a data path is determined, the user interface 800 may display information in a data path window 810 regarding the data path associated with the selected port. The data path window 810, for instance, may show the progression of ports along which an optical signal travels, may display the measured gain or attenuation of the signal at each node, the physical location of the patch panel for each port, and may display the length of the optical cable between network nodes.

The user interface 800 may include a shift traffic button 812 that allows a user to shift network traffic from one port to another port so that the port or associated cable may be inspected or cleaned without disrupting network traffic. A toggle LED 814 button may also be included on the user interface 800 that sends a control signal to toggle an LED at the selected port on or off so that a user may easily identify the port at the patch panel. Tapping a devices button 816 may retrieve a list of the devices associated with the selected port and allow a user to interact with certain devices. For example, a networking device may be attached to a port and configured to apply a user-specified signal along with an active network signal applied to the port so that the user-specified signal may be easily detected at another point in the network. The user interface 800 may include a network map button 818, which the user may tap to generate a network map depicting network relationships between devices, datacenters, patch panels, and/or patch panel ports. By selecting an inject signal 820 button, a user may control the signal injection devices 323 to introduce signals on the optical cables. In particular, the inject signal button 820 may cause a control panel to be displayed that allows the user to adjust whether a signal is injected on an optic cable of a selected port, and the characteristics of the signal injected (e.g., waveform, amplitude, frequency). Those of ordinary skill in the art will appreciate that the example of the user interface 800 is merely illustrative of the ways in which the features described herein may be implemented.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

Figure 9:
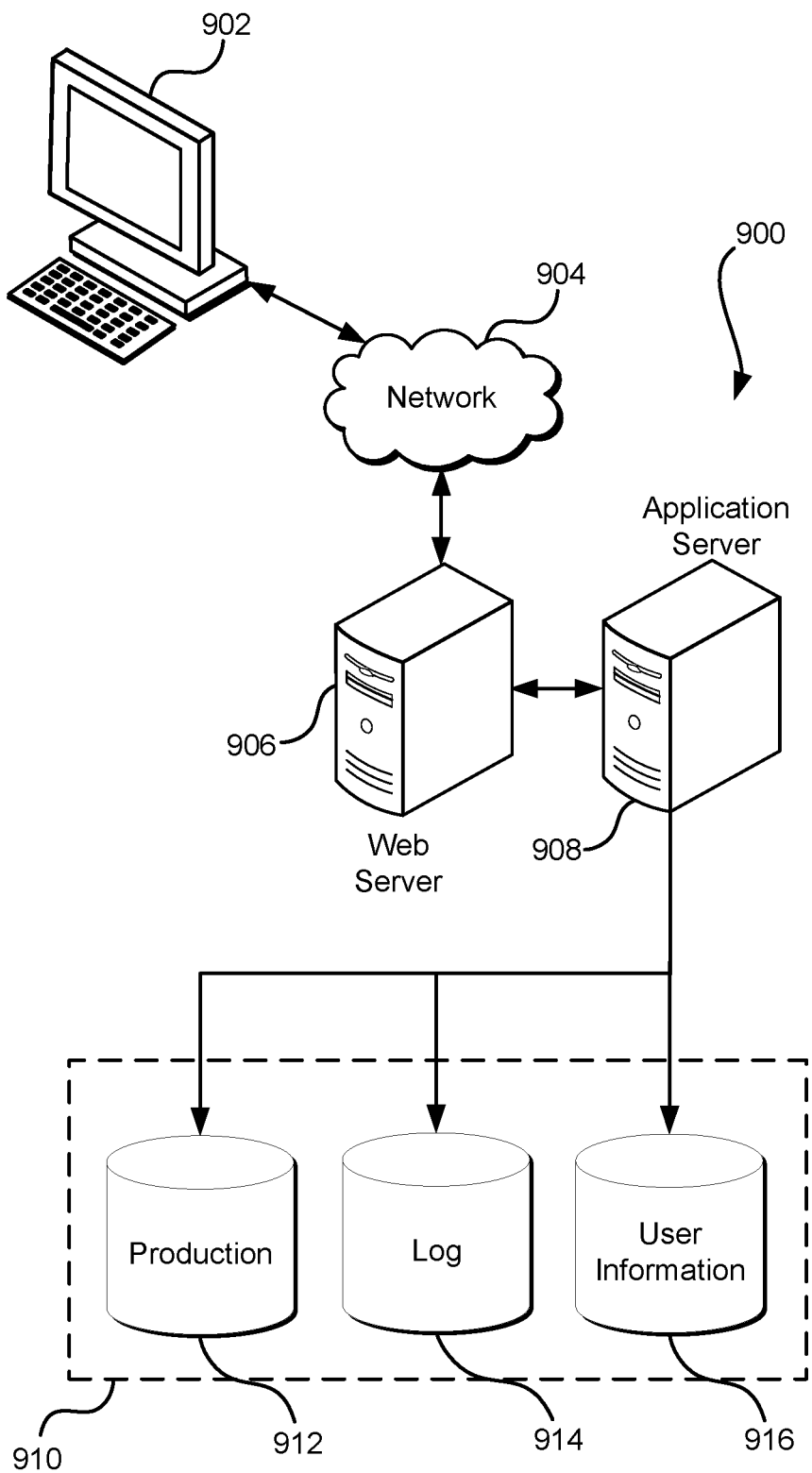
FIG. 9 illustrates an environment in which various embodiments can be implemented.

FIG. 9 illustrates aspects of an example environment 900 for implementing aspects in accordance with various embodiments. As will be appreciated, although a web-based environment is used for purposes of explanation, different environments may be used, as appropriate, to implement various embodiments. The environment includes an electronic client device 902, which can include any appropriate device operable to send and/or receive requests, messages, or information over an appropriate network 904 and, in some embodiments, convey information back to a user of the device. Examples of such client devices include personal computers, cell phones, handheld messaging devices, laptop computers, tablet computers, set-top boxes, personal data assistants, embedded computer systems, electronic book readers, and the like. The network can include any appropriate network, including an intranet, the Internet, a cellular network, a local area network, a satellite network or any other such network and/or combination thereof. Components used for such a system can depend at least in part upon the type of network and/or environment selected. Many protocols and components for communicating via such a network are well known and will not be discussed herein in detail. Communication over the network can be enabled by wired or wireless connections and combinations thereof. In this example, the network includes the Internet and/or other publicly-addressable communications network, as the environment includes a web server 906 for receiving requests and serving content in response thereto, although for other networks an alternative device serving a similar purpose could be used as would be apparent to one of ordinary skill in the art.

The illustrative environment includes at least one application server 908 and a data store 910. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered environment. The application server can include any appropriate hardware, software and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video and/or other content usable to be provided to the user, which may be served to the user by the web server in the form of HyperText Markup Language ("HTML"), Extensible Markup Language ("XML"), JavaScript, Cascading Style Sheets ("CSS"), JavaScript Object Notation (JSON), and/or another appropriate client-side structured language. Content transferred to a client device may be processed by the client device to provide the content in one or more forms including, but not limited to, forms that are perceptible to the user audibly, visually and/or through other senses. The handling of all requests and responses, as well as the delivery of content between the client device 902 and the application server 908, can be handled by the web server using PHP: Hypertext Preprocessor ("PHP"), Python, Ruby, Perl, Java, HTML, XML, JSON, and/or another appropriate server-side structured language in this example. Further, operations described herein as being performed by a single device may, unless otherwise clear from context, be performed collectively by multiple devices, which may form a distributed and/or virtual system.

The data store 910 can include several separate data tables, databases, data documents, dynamic data storage schemes and/or other data storage mechanisms and media for storing data relating to a particular aspect of the present disclosure. For example, the data store illustrated may include mechanisms for storing production data 912 and user information 916, which can be used to serve content for the production side. The data store also is shown to include a mechanism for storing log data 914, which can be used for reporting, analysis or other such purposes. It should be understood that there can be many other aspects that may need to be stored in the data store, such as page image information and access rights information, which can be stored in any of the above listed mechanisms as appropriate or in additional mechanisms in the data store 910. The data store 910 is operable, through logic associated therewith, to receive instructions from the application server 908 and obtain, update or otherwise process data in response thereto. The application server 908 may provide static, dynamic, or a combination of static and dynamic data in response to the received instructions. Dynamic data, such as data used in web logs (blogs), shopping applications, news services, and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 902. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed (i.e., as a result of being executed) by a processor of the server, allow the server to perform its intended functions.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 8. Thus, the depiction of the system 800 in FIG. 8 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network. These devices also can include virtual devices such as virtual machines, hypervisors and other virtual devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network, a satellite network, and any combination thereof. In some embodiments, connection-oriented protocols may be used to communicate between network endpoints. Connection-oriented protocols (sometimes called connection-based protocols) are capable of transmitting data in an ordered stream. Connection-oriented protocols can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers, and business application servers. The server(s) also may be capable of executing programs or scripts in response to requests from user devices, such as by executing one or more web applications that may be implemented as one or more scripts or programs written in any programming language, such as Java®, C, C # or C++, or any scripting language, such as Ruby, PHP, Perl, Python or TCL, as well as combinations thereof. The server(s) may also include database servers, including without limitation those commercially available from Oracle®, Microsoft®, Sybase and IBM® as well as open-source servers such as MySQL, Postgres, SQLite, MongoDB, and any other server capable of storing, retrieving, and accessing structured or unstructured data. Database servers may include table-based servers, document-based servers, unstructured servers, relational servers, non-relational servers, or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen, or keypad) and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. In addition, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, the term "plurality" indicates a state of being plural (e.g., "a plurality of items" indicates multiple items). The number of items in a plurality is at least two, but can be more when so indicated either explicitly or by context.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory. In some embodiments, the code is stored on set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media may comprise multiple non-transitory computer-readable storage media and one or more of individual non-transitory storage media of the multiple non-transitory computer-readable storage media may lack all of the code while the multiple non-transitory computer-readable storage media collectively store all of the code. Further, in some examples, the executable instructions are executed such that different instructions are executed by different processors. As an illustrative example, a non-transitory computer-readable storage medium may store instructions. A main CPU may execute some of the instructions and a graphics processor unit may execute other of the instructions. Generally, different components of a computer system may have separate processors and different processors may execute different subsets of the instructions.

Accordingly, in some examples, computer systems are configured to implement one or more services that singly or collectively perform operations of processes described herein. Such computer systems may, for instance, be configured with applicable hardware and/or software that enable the performance of the operations. Further, computer systems that implement various embodiments of the present disclosure may, in some examples, be single devices and, in other examples, be distributed computer systems comprising multiple devices that operate differently such that the distributed computer system performs the operations described herein and such that a single device may not perform all operations.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

What is claimed is:

1. A computer-implemented method, comprising:
    determining, at a network management service of a computer network, first information regarding a signal tapped from a fiber optic cable connected to a first network port of a first network panel in the computer network, the first information comprising an optical power of an optical signal measured at the first network port, wherein the first network port is a port of a first patch panel for connecting a first set of optic cable ends;
    determining, at the network management service, second information regarding a signal tapped from a fiber optic cable connected to a second network port of a second network panel in the computer network, the second information comprising an optical power of an optical signal measured at the second network port, wherein the second network port is a port of a second patch panel for connecting a second set of optic cable ends, the second patch panel being a different patch panel from the first patch panel;

performing a comparison of the first information with the second information;

determining, as a result of the comparison, that the signal tapped from the fiber optic cable connected to the first network port corresponds to the signal tapped from the fiber optic cable connected to the second network port;

recording, in a database, a data path through the computer network between the first network port and the second network port, the data path indicating that the signal received at the second network port corresponds to the signal transmitted from the first network port; and in response to a request received via an interface, shifting network traffic from the second network port to a third network port on the second patch panel.

2. The computer-implemented method of claim 1, further comprising:

receiving, at the network management service, third information regarding a signal tapped from a fiber optic cable connected to a fourth network port of a third network panel in the computer network, the third information comprising an optical power of an optical signal measured at the fourth network port;

determining that the signal tapped from the fiber optic cable connected to the fourth network port corresponds to the signal received at the first network port or the signal transmitted from the second network port; and recording, in the database, a second data path through the computer network between the fourth network port and the first network port or the second network port, the second data path indicating that the second network port or the third fourth network port connects the first network port with the other of the second network port or the fourth network port.

3. The computer-implemented method of claim 1, further comprising generating a network map indicating network connectivity between network nodes associated with the network management service using the data path.

4. A system, comprising:

one or more processors;

memory that stores computer-executable instructions that, if executed, cause the system to:

receive information regarding a first optical signal corresponding to a first optic cable connected to a first network port of a computer network and information regarding a second optical signal corresponding to a second optic cable connected to a second network port of the computer network, wherein the first network port is a port of a first patch panel for connecting a first set of optic cable ends, and the second network port is a port of a second patch panel for connecting a second set of optic cable ends, the second patch panel being a separate patch panel from the first patch panel;

determine that the first optic cable corresponds to the second optic cable as a result of a correspondence between a characteristic of a first signal tapped from the first optic cable and a characteristic of a second signal tapped from the second optic cable;

record a data path association between the first network port corresponding to the first optic cable and the second network port corresponding to the second optic cable; and in response to a request received via an interface, shift network traffic from the second network port to a third network port on the second patch panel.

5. The system of claim 4, wherein:

the computer-executable instructions further cause the system to introduce a third signal having an optical characteristic specified by a user onto the first optic cable without disrupting information conveyed via the first signal; and the computer-executable instructions that determine that the first signal corresponds to the second signal cause the system to determine that the first signal corresponds to the second signal as a result of detecting the optical characteristic in an optic cable conveying the second signal.

6. The system of claim 4, wherein the first signal is determined as corresponding to the second signal as a result of a correspondence between an optical characteristic of the first signal and an optical characteristic of the second signal.

7. The system of claim 4, wherein the correspondence is indicated by an evolution of optical power of the first signal over a time period being similar to an evolution of optical power of the second signal over the time period.

8. The system of claim 4, wherein the correspondence is determined based on matching a change in the first signal with a detected change in the second signal.

9. The system of claim 4, wherein the first network port is a network port of a service provider and the second network port is a network port of another entity located remotely from the service provider.

10. The system of claim 4, wherein the computer-executable instructions further cause the system to shift network traffic from the second network port to a third network port.

11. The system of claim 4, wherein an optic splitter splits the first optic cable into a first branch and a second branch, an optical sensor detecting an optic signal on the first branch or the second branch, and the other of the first branch or the second branch being connected to the first port.

12. A non-transitory computer-readable storage medium having stored thereon executable instructions that, as a result of being executed by one or more processors of a computer system, cause the computer system to at least:

obtain information relating to a first optical signal read from a first optic cable connected to a first network port of a computer network, wherein the first network port is a port of a first patch panel for connecting a first set of optic cable ends;

determine a correspondence between a second optic cable connected to a second network port of the computer network, wherein the second network port is a port of a second patch panel and the first optic cable, wherein, and the second network port is a port of a second patch panel for connecting a second set of optic cable ends, the second patch panel being a separate patch panel from the first patch panel, the correspondence being determined based on a correlation between the information relating to the first optical signal with information relating a second optical signal read from the second optic cable;

store data path information indicating that the first optical signal and the second optical signal travel on a same path in the computer network; and in response to a request received via an interface, shift network traffic from the second network port to a third network port on the second patch panel.

13. The non-transitory computer-readable storage medium of claim 12, wherein the executable instructions further cause the computer system to provide a notification to a user indicating data path information regarding the first optical signal and the second optical signal.

14. The non-transitory computer-readable storage medium of claim 12, wherein the correlation between information relating to the first optical signal with the information relating to the second optical signal is a correlation of an evolution in optical power over a time period.

15. The non-transitory computer-readable storage medium of claim 12, wherein the data path information is associated with identification information of the first network port corresponding to the first optic cable or the second network port corresponding to the second optic cable.

16. The non-transitory computer-readable storage medium of claim 12, wherein the executable instructions cause the computer system to determine a fault associated with the first network port or the second network port based at least in part on a decline in optical signal power.

17. The non-transitory computer-readable storage medium of claim 12, wherein the executable instructions cause the computer system to use the data path information and other data path information to generate a network map for the computer network.

18. The non-transitory computer-readable storage medium of claim 12, wherein the executable instructions cause the computer system to determine the correspondence in response to a request to determine data path information related to a port specified in the request.

19. The system of claim 4, wherein the computer-executable instructions further cause the system to cause the interface to display the data path association.

20. The non-transitory computer-readable storage medium of claim 17, wherein the network map designates an association between the first patch panel and at least one of:
 the second patch panel,
 a networking device,
 a computing resource, or
 a location.

* * * * *